United States Patent Office 3,546,284
Patented Dec. 8, 1970

3,546,284
PURIFICATION OF COMMERCIAL
TEREPHTHALIC ACID
Ferdinand List and Helmut Alfs, Marl, Germany, assignors to Chemische Werke Huls A.G., Marl, Germany
No Drawing. Filed Oct. 2, 1967, Ser. No. 672,023
Claims priority, application Germany, Oct. 12, 1966,
C 40,369
Int. Cl. C07c 51/42
U.S. Cl. 260—525                9 Claims

ABSTRACT OF THE DISCLOSURE

Terephthalaldehydic acid contamination of commercial terephthalic acid is virtually eliminated by dissolving the commercial acid in aqueous alkali and treating the resulting solution at elevated temperature with hydrogen peroxide.

---

Applicants hereby claim the benefit of the filing date of German patent application C 40,369 filed Oct. 12, 1966, pursuant to the provisions of 35 U.S.C. 119.

BACKGROUND OF THE INVENTION

This invention relates to a process for the purification of commercial, i.e. crude, terephthalic acid containing terephthalaldehydic acid, i.e., 4-formyl-benzoic acid, $C_8H_6O_3$. Commercial terephthalic acid generally does not have the required degree of purity for producing polyglycol terephthalates with good film- and fiber-forming properties. This applies to terephthalic acid obtained: (a) according to the process of U.S. Pat. 2,245,528 by air oxidation of p-xylene in a solvent, such as acetic acid, in the presence of a manganese or cobalt salt of an inorganic or organic acid at a temperature of 130–250° C.; (b) according to the process of U.S. Pat. 2,276,774 with the simultaneous addition of lead bromide or barium bromide; and (c) according to the process of British Pat. 578,608 in the presence of hydrogen bromide or compounds evolving hydrogen bromide under the reaction conditions.

When oxidizing p-xylene by means of air in accordance with the above-noted procedures, a terephthalic acid having a content of terephthalaldehydic acid of about 1–2% is produced. Surprisingly, this terephthalaldehydic acid cannot be removed from the terephthalic acid by the customary purification methods. Extraction of the aldehydic acid cannot be effected even by treating same for the longest time with a great variety of solvents. Likewise, the aldehydic acid is completely resistant, while in the crude terephthalic acid, to renewed oxidation in air under standard conditions (180–190° C.).

A number of complex processes have been suggested for the removal of terephthalaldehydic acid from crude terephthalic acid. According to Japanese patent application 12,695/65, crude acid (obtained by catalytically oxidizing p-xylene by means of air in the presence of acetic acid and with cobalt acetate, manganese acetate and ammonium bromide) is subjected to a second air oxidation at 250° C.; however, in this process a highly corrosive medium is present.

Dutch patent application 6,407,790 proposes two temperature ranges for the oxidation, namely: 193° C. at first, and then 205–246° C.; the terephthalaldehydic acid content, however, is still not reduced below 0.5%. According to Dutch patent application 6,403,348, crude terephthalic acid is catalytically hydrogenated in an aqueous solution at 200–400° C., although such solutions (even at temperatures as low as about 250° C.) have so strong a corrosive effect that even titanium cannot be employed as the material for the reaction vessel because of the temperature and, more particularly, because of the hydrogenating conditions.

The process of Dutch patent application 6,508,021 involves a sublimation at 304–393° C. with nitrogen as the carrier gas, and an inert solvent which selectively dissolves the terephthalaldehydic acid as the absorption medium.

According to DAS (German published application) 1,140,922, crude terephthalic acid, dissolved in an aqueous-alkaline solution, is treated with permanganate, but in this process manganese dioxide precipitates in an extremely fine or even colloidal form, requiring a filter aid such as diatomaceous earth during the filtration. Thereafter, the filtered solution must once more be treated with a particularly effective activated charcoal until discoloration of the solution disappears.

It is also possible to esterify the crude terephthalic acid with methanol first, and then remove the methyl ester of terephthalaldehydic acid from dimethyl terephthalate. This can be done (British Pat. 938,318) by heating the crude ester with a compound which reacts with the aldehyde group, whereupon the aldehyde condensation product and dimethyl terephthalate are separable by distillation. Also the crude ester can be treated, in the presence of a catalyst soluble in the reaction system, with molecular oxygen at 200–280° C.; the ester can then be separated from the oxidized impurities by means of distillation.

With respect to the use of peroxides, although German patent application B 21,813 indicates that p-tolil (p,p-dimethyl benzil) can be oxidized to terephthalic acid, the oxidation is arrested at the formation of p-toluic acid when alkaline hydrogen peroxide is employed. Furthermore, according to U.S. Pat. 1,943,892, organic acids are freed from impurities by treatment with an oxidizing agent, such as hypohalites or peroxides, but there is no indication therein that the peroxides neither attack aromatic carboxylic acids nor adversely affect the substitution products and derivatives thereof. Also with respect to the latter patent, there is neither a working example using peroxides, nor a mention of terephthalic acid, much less terephthalaldehydic acid. In the present invention, extreme purities are required for producing terephthalic acid qualified for fiber production. It would not have been considered by one skilled in the art that such purities could be achieved by the U.S. Patent, because the only teaching of this patent is to transform the impurities into harmless substances, to remove or to destroy them. The present problem, however, is not the usual bleaching of an impure substance but a novel process, by which a defined residual intermediate product is oxidized to terephthalic acid completely without any formation of undesired traces of other substances.

The numerous suggestions make it clear that a satisfactory method has not been developed heretofore, particularly since those processes directly related to the problem are very expensive and, in part, technically difficult to conduct.

SUMMARY OF THE INVENTION

The difficulties encountered in removing terephthalaldehydic acid from crude terephthalic acid have been many and varied. Such difficulties are avoided, according to the invention, by dissolving commercial terephthalic acid in aqueous alkali and treating the resulting solution with hydrogen peroxide at a moderately elevated temperature.

Commercial terephthalic acid, particularly such acid produced according to the oxidation processes hereinbefore described, contains not more than about 2.5% by weight of terephthalaldehydic acid. Since the process of this invention removes the terephthalaldehydic acid safely and rapidly, however, it is also possible to employ it for those terephthalic acids having a substantially higher content of terephthalaldehydic acid, for example, 10% by weight.

Suitable aqueous alkalis are solutions of sodium and potassium hydroxide, sodium and potassium carbonate and ammonia of about 5–15% by weight. At a higher alkaline concentration, alkali terephthalates precipitate. Solutions having an alkali concentration from about 5 to 10% by weight are preferred.

The dissolution of crude terephthalic acid in such aqueous alkalis does not pose any difficulties, since, due to the positive heat of reaction, the recommended temperature for the subsequent oxidation step is approximated by this dissolving step.

As moderately elevated reaction temperatures, the ranges of from 20° C. to 100° C., particularly 30° C. to 70° C. and preferably about 50° C. are suitable.

The hydrogen peroxide is added at any desired concentration, e.g., as a 30% by weight aqueous solution, all at once or in intermittent batches. The amount of hydrogen peroxide is dependent upon the aldehyde content of the acid. Generally, 2.5–7 grams of 100% hydrogen peroxide are required per kilogram of terephthalic acid with about 1–2.5% (by weight) of terephthalaldehydic acid.

The oxidation process, the progress of which can be observed iodometrically by decrease in peroxide by titration with thiosulfate, is terminated, depending upon the temperature, in a period of from about 10 to 60 minutes.

After the oxidation is complete, the terephthalic acid is precipitated. Additional purification and working-up steps, such as the separation of by-products or resultant products, are unnecessary. For precipitation purposes, all acids are suitable which are capable of liberating terephthalic acid from alkali terephthalate solutions, such as hydrochloric acid, sulfuric acid, nitric acid, and carbon dioxide. Preferred are hydrochloric or sulfuric acid and carbon dioxide.

The process of this invention can be conducted batchwise or continuously. It provides means for preparing terephthalic acid virtually free of terephthalaldehydic acid. Moreover, the oxidation agent employed is completely decomposed. Therefore, neither residues nor reaction products thereof need be removed. However, it is particularly surprising that, at the same time, a decided improvement in the color quality of the terephthalic acid is obtained. The color quality of the acid corresponds to that of an extremely purified terephthalic acid; it is suitable and can be used for the production of polyethylene terephthalate according to known procedures by immediate esterification with ethylene glycol and subsequent condensation. In general, the terephthalic acid produced by this invention has the following analysis:

Acid number—675
Content of terephthalaldehydic acid—<0.02% by weight.
Analysis:
    Fe—2.0±0.1 p.p.m.
    Co—0.2±0.1 p.p.m.
    Mn—Not traceable.
    Ti—Not traceable.
    Cu—0.2±0.1 p.p.m.
    Ash—0.02% by weight.
Light permeability (wavelength 340 m$\mu$) (layer thickness 10 mm.)—>92%.

Without further elaboration, it is believed that one skilled in the art can, using the preceding description, utilize the present invention to its fullest extent. The following preferred specific embodiments are, therefore, to be construed as merely illustrative and not limitative of the remainder of the specification and claims in any way whatsoever.

EXAMPLE 1

In the continuous air oxidation of p-xylene in the presence of acetic acid and with cobalt ions and bromine ions, in accordance with United States Pat. 2,276,774, at a temperature of 170–210° C. and a pressure of 10–20 atmospheres, a crude terephthalic acid is obtained which contains, after washing and drying, 100 parts of the crude terephthalic acid containing 2.3% terephthalaldehydic acid. This crude terephthalic acid is dissolved in 900 parts of aqueous 6% sodium hydroxide solution and mixed under agitation, with 3 g. of hydrogen peroxide ($H_2O_2$) in the form of a 30% by weight aqueous solution at 50–60° C. After 10 minutes, the iodometric indication of peroxide with sodium thiosulfate is negative. The acid, which is precipitated with 170 g. of hydrochloric acid (30%) has an acid number of 674 and a terephthalaldehydic acid content of 0.08%.

If no $H_2O_2$ treatment is conducted and, instead, the crude terephthalic acid is merely dissolved in water as an alkali salt and then immediately precipitated with a mineral acid, the aldehyde content of the reprecipitated acid is unchanged, i.e. 2.3%.

EXAMPLE 2

100 parts of thus-obtained terephthalic acid having a terephthalaldehydic acid content of 1.25%, produced by the catalytic air oxidation of p-xylene, are dissolved in a 10% aqueous KOH solution and are treated with 3 g. of $H_2O_2$ in the form of a 30% solution at 40–50° C. After 30 minutes, the terephthalic acid is precipitated with 340 g. of sulfuric acid (20%). The aldehydic acid content of the thus-prepared terephthalic acid is so small that it cannot be detected. (Lower limit of detection: <0.02%.)

EXAMPLE 3

The catalytic air oxidation of p-xylene is conducted in a discontinuous process in the presence of acetic acid and with cobalt and bromine ions at a temperature of 130–140° C., instead of 180–190° C. A terephthalic acid is obtained having 7.5% aldehydic acid.

100 parts of thus-obtained crude terephthalic acid having a 7.5% aldehydic acid content are dissolved in a minimum amount of 10% aqueous sodium hydroxide (NaOH) solution. Twelve grams of $H_2O_2$, in the form of a 30% by weight aqueous solution, are admixed with the resultant solution for 45 minutes.

After precipitation with a mineral acid, a terephthalic acid is obtained having an acid number of 674 and a terephthalaldehydic acid content of 0.078%.

For purposes of comparison, a terephthalic acid produced by the saponification of pure dimethyl terephthalate with a so-called fiber quality, is tested as follows. 7.5 g. acid are dissolved in 50 cc. 2 N aqueous KOH solution. The light permeability of this potassium terephthalate solution is compared with the light premeability of pure potassium hydroxide solution. The measurement is conducted in a spectrophotometer at a wavelength of 340 m$\mu$ and a layer thickness of 10 mm. The transparency of the pure terephthalic acid is 95%, that of the unpurified acid, 82%, whereas the transparency of the acid purified in accordance with Example 2 is 93.2%.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be within the full range of equivalence of the following claims.

What is claimed is:

1. In a process for the purification of crude terephthalic acid containing not more than about 10% by weight of terephthalaldehydic acid, the steps consisting essentially of
   (a) dissolving said crude terephthalic acid in aqueous alkali of 5–15% by weight to convert terephthaldehydic acid to an alkali salt thereof;
   (b) admixing an oxidizing agent consisting essentially of hydrogen peroxide with the resulting solution at about 20–100° C. to oxidize said alkali salt of terephthalaldehydic acid to alkali salt of terephthalic acid, the amount of hydrogen peroxide admixed being about 2.5–7 grams of $H_2O_2$ per each 10–25 grams of terephthalaldehydic acid in said crude, the oxidation being conducted for about 10–60 minutes; and
   (c) acidifying the resultant oxidized solution to form a precipitate of purified terephthalic acid of roughly the following analysis:
   Acid number—674–675.
   content of terephthalaldehydic acid—<0.08% by weight.
   analysis:
   Fe—2.0±0.1 p.p.m.
   Co—0.2±0.1 p.p.m.
   Mn—not traceable.
   Ti—not traceable.
   Cu—0.2±0.1 p.p.m.
   ash—0.02% by weight.
   light permeability (wavelength 340 m$\mu$) (layer thickness 10 mm.)—>92%.

2. A process according to claim 1 wherein the alkali is a member selected from the group consisting of sodium hydroxide, potassium hydroxide, sodium carbonate, potassium carbonate and ammonia and its concentration in the aqueous alkali is from 5 to 15 percent by weight.

3. A process according to claim 2 wherein the temperature is about 30–70° C. and the concentration of aqueous alkali is 5–10% by weight.

4. A process as defined by claim 1 wherein the crude terephthalic acid contains not more than about 2.5% by weight of terephthalaldehydic acid.

5. A process as defined by claim 3 wherein the crude terephthalic acid contains not more than about 2.5% by weight of terephthalaldehydic acid.

6. A process as defined by claim 1 wherein the reaction temperature is about 50° C. and the reaction time is about 10–60 minutes.

7. A process according to claim 1 wherein the temperature is about 30–70° C. and the concentration of aqueous alkali is 5–10% by weight.

8. A process as defined by claim 2 wherein the reaction temperature is about 50° C. and the reaction time is about 10–60 minutes.

9. A process as defined by claim 5 wherein the reaction temperature is about 50° C. and the reaction time is about 10–60 minutes.

References Cited

UNITED STATES PATENTS

| | | | |
|---|---|---|---|
| 1,943,892 | 1/1934 | Jaeger et al. | 260—525 |
| 3,069,461 | 12/1962 | Sidi | 260—525 |
| 3,288,849 | 11/1966 | Meyer | 260—525 |
| 3,361,804 | 1/1968 | Alagy | 260—525 |

JAMES A. PATTEN, Primary Examiner

R. S. WEISSBERG, Assistant Examiner